(12) United States Patent
Diaz

(10) Patent No.: US 10,029,634 B1
(45) Date of Patent: Jul. 24, 2018

(54) VEHICLE BUMPER ASSEMBLY

(71) Applicant: Nissan North America, Inc., Franklin, TN (US)

(72) Inventor: Pedro Diaz, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/647,701

(22) Filed: Jul. 12, 2017

(51) Int. Cl.
 *B60R 19/18* (2006.01)
 *B60R 19/24* (2006.01)

(52) U.S. Cl.
 CPC .............. *B60R 19/18* (2013.01); *B60R 19/24* (2013.01); *B60R 2019/1813* (2013.01); *B60R 2019/1886* (2013.01)

(58) Field of Classification Search
 CPC .................................. B60R 19/18; B60R 19/24
 USPC .......................................... 293/102, 120, 117
 See application file for complete search history.

(56) References Cited

U.S. PATENT DOCUMENTS

| | | | | |
|---|---|---|---|---|
| 3,738,696 A | * | 6/1973 | McLauchlan | ......... B60R 19/285 293/133 |
| 6,139,044 A | | 10/2000 | Smith et al. | |
| 6,402,179 B1 | * | 6/2002 | Morris | ................... B60D 1/485 280/495 |
| 7,156,433 B2 | * | 1/2007 | Evans | ...................... B60D 1/52 293/117 |
| 2006/0255602 A1 | * | 11/2006 | Evans | ..................... B60R 19/18 293/120 |
| 2008/0143125 A1 | | 6/2008 | Nees et al. | |
| 2009/0218788 A1 | | 9/2009 | Hughes et al. | |

OTHER PUBLICATIONS

Photographs of Mitsubishi L200 truck, plastic fascia and inner metal support structure—2015.
CAD drawings of Current Nissan H60A design—2016.

* cited by examiner

*Primary Examiner* — Joseph D. Pape

(57) ABSTRACT

A vehicle bumper assembly includes a bumper support and a facia member. The bumper support has a central portion and lateral portions on opposite sides of the central portion. The lateral portions are vertically higher than the central portion. The fascia member is shaped and configured to cover and conceal at least upper, side and rearward facing surfaces of the bumper support. The fascia member has a central fascia portion, a pair of lateral fascia portions and an upright fascia portion. The central fascia portion overlays and covers the central portion of the bumper support. The pair of lateral fascia portions overlay and cover the pair of lateral portions of the bumper support. The upright fascia portion extends upward from the central fascia portion from a first of the pair of lateral fascia portions to a second of the pair of lateral fascia portions.

14 Claims, 6 Drawing Sheets

VEHICLE BUMPER ASSEMBLY

BACKGROUND

Field of the Invention

The present invention generally relates to vehicle bumper assembly. More specifically, the present invention relates to a vehicle bumper assembly that includes two levels of steps covered by a flexible fascia.

Background Information

Pickup trucks typically include a metal bumper. The metal bumper is often painted and/or provided with a chrome finish.

SUMMARY

One object of the present disclosure is to provide a pickup truck rear bumper with a fascia that improves overall appearance.

Another object of the present disclosure is to provide a rear bumper assembly with at least two step surfaces relative to vertical to make it easier to climb up to the rear of the vehicle.

In view of the state of the known technology, one aspect of the present disclosure is to provide a vehicle bumper assembly with a bumper support part and a fascia member. The bumper support part has a central portion defining a first step plane located a first distance above ground level when installed to a vehicle, and a pair of lateral portions on opposite sides of the central portion defining a second step plane located a second distance above ground level when installed to the vehicle. The second distance is greater than the first distance. The fascia member is shaped and configured to cover and conceal at least upper, side and rearward facing surfaces of the bumper support part. The fascia member has a central fascia portion overlaying and covering the central portion of the bumper support part. The pair of lateral fascia portions overlay and cover the pair of lateral portions of the bumper support part. An upright fascia portion extends upward from the central fascia portion from a first of the pair of lateral fascia portions to a second of the pair of lateral fascia portions. The fascia member is a one piece, monolithic, unitarily formed element.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
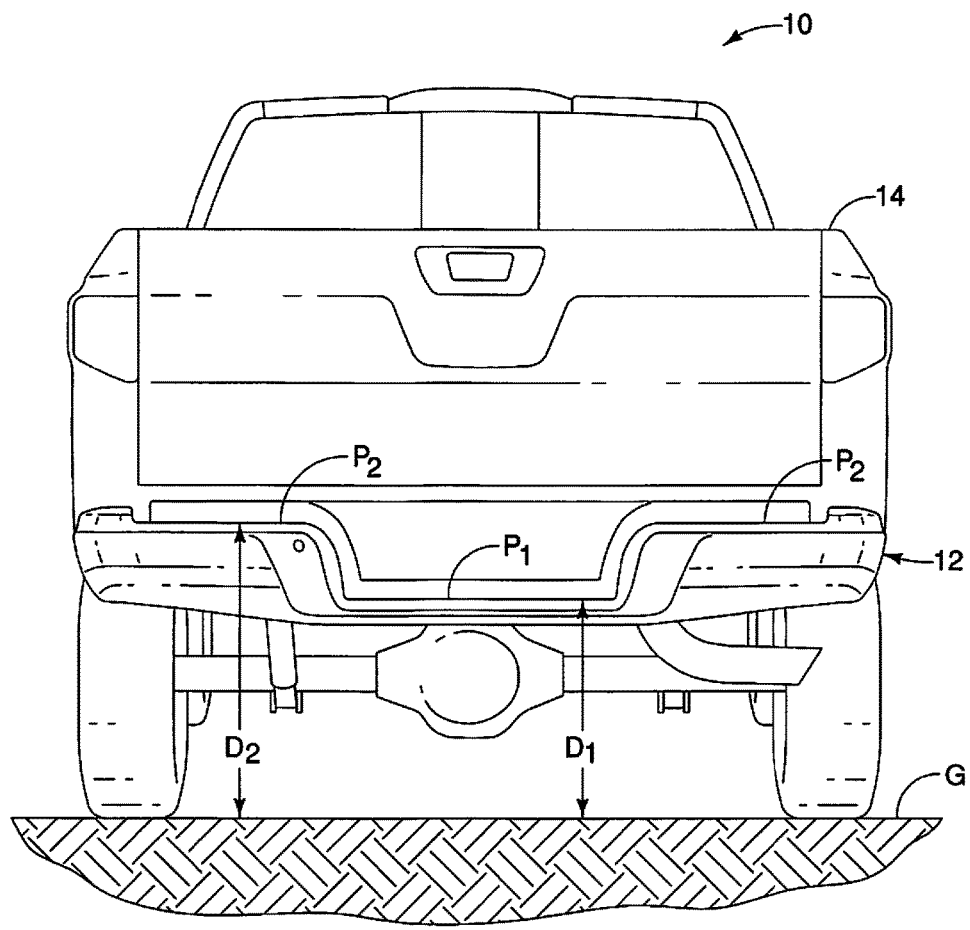
FIG. 1 is a rear view of a vehicle showing a bumper assembly having a center area that defines a first step plane and lateral areas that define second step plane that are higher above the ground than the first step plane in accordance with a first embodiment.

Referring initially to FIG. 1, a rear view of a vehicle 10 having a vehicle bumper assembly 12 (hereinafter referred to as the bumper assembly 12) is illustrated in accordance with a first embodiment.

The vehicle 10 is depicted as a pickup truck but can alternatively be any vehicle that could benefit from the features of the bumper assembly 12, as described below. The vehicle 10 include a rear cargo area structure 14 that is supported by, for example, two beams 16 (shown in FIG. 5 only).

The bumper assembly 12 includes a bumper support part 20, a fascia member 22, optional diagonal brackets 24, and attachment brackets 26 and 28.

Figure 3:
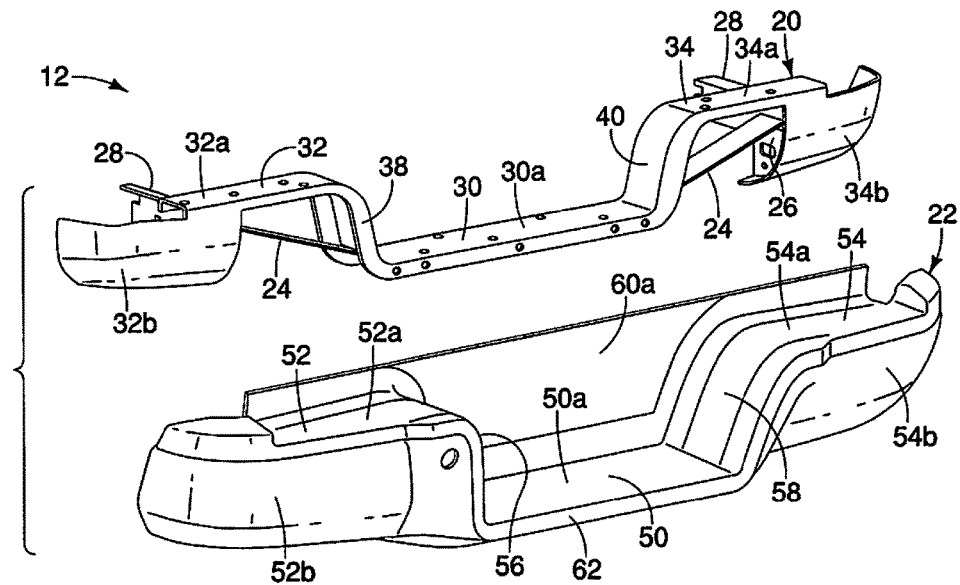
FIG. 3 is an exploded view of the bumper assembly showing a metal bumper support part and a fascia member in accordance with the first embodiment.

The bumper support part 20 is formed with a central portion 30, a first lateral portion 32 and a second lateral portion 34, where the first and second lateral portions 32 and 34 define a pair of lateral portions 32 and 34. The first lateral portion 32 is located on one lateral side of the central portion 30 and the second lateral portion 34 is located on an opposite lateral side of the central portion 30. As shown in FIG. 3, the central portion 30 has an upper surface hereinafter referred to as a center step support surface 30a that is approximately level (parallel to ground level G) with the bumper assembly 12 installed to the vehicle 10. Similarly, respective upper surfaces of the first and second lateral portions 32 and 34, hereinafter referred to as lateral step support surfaces 32a and 34a, are also approximately level with the bumper assembly 12 installed to the vehicle 10.

The center step support surface 30a of the central portion 30 defines a first step plane $P_1$ located a first distance $D_1$ above ground level G, as shown in FIG. 1. The lateral step support surfaces 32a and 34a of the first and second lateral portion 32 and 34 (the pair of lateral portions) are level with one another and define a second step plane $P_2$ located a second distance $D_2$ above ground level G. The second distance $D_2$ is greater than the first distance $D_1$. In other words, the upper surfaces of the first and second lateral portions 32 and 34 are higher than the upper surface of the central portion 30. Further, the first step plane $P_1$ and the second step plane $P_2$ are parallel to one another.

As shown in FIG. 3, the first lateral portion 32 includes a contoured and curved portion 32b that is rounded laterally outward and rounded downward in order to provide rigidity behind the fascia member 22. Similarly, the second lateral portion 34 includes a contoured and curved portion 34b that is rounded laterally outward and rounded downward in order to provide rigidity behind the fascia member 22.

The bumper support part 20 further includes curved portions 38 and 40. The curved portion 38 extends upward from a first side of the central portion 30, curving upward to seamlessly join with the first lateral portion 32. Similarly, the curved portion 40 extends upward from a second side of the central portion 30 (opposite the first side), curving upward to seamlessly join with the second lateral portion 34.

The bumper support part 20 is formed as a one piece, monolithic, unitarily formed element (absent the optional diagonal brackets 24, and attachment brackets 26 and 28). More specifically, the central portion 30, the first lateral portion 32, the second lateral portion 34, and the curved portions 38 and 40, are all formed from a single sheet of metal material by press-forming that is work hardened in the forming process.

Figure 4:
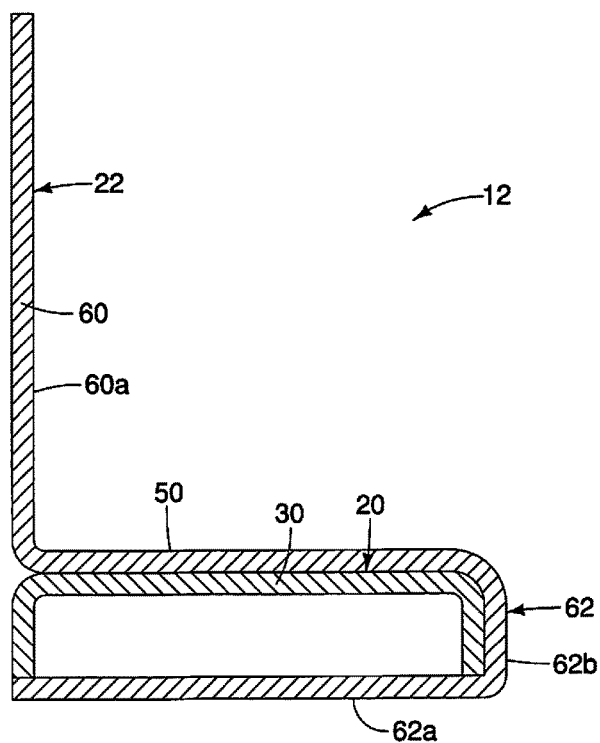
FIG. 4 is a cross-sectional view of the bumper assembly taken along the line 4-4 in FIG. 2, showing a pocket portion of the fascia member at least partially surrounding the metal bumper support part in the center area of the bumper assembly in accordance with the first embodiment.

As shown in FIG. 3, the fascia member 22 is shaped and configured to cover and conceal at least upper, side and rearward facing surfaces of the bumper support part 20. For example, the fascia member 22 has a central fascia portion 50, a first lateral fascia portion 52, a second lateral fascia portion 54, a first upwardly extending portion 56, a second upwardly extending portion 58 and an upright fascia portion 60. The central fascia portion 50 overlays and covers the central portion 30 of the bumper support part 20. The central fascia portion 50 is also part of a pocket area 62, as shown in FIG. 4. The pocket area 62 includes a lower portion 62a and an edge portion 62b that are joined with the central fascia portion 50. The pocket area 62 is dimensioned and configures such that the central portion 30 of the bumper support part 20 is inserted into the pocket area 62. Hence, with the bumper assembly 12 installed to the vehicle 10, the pocket area 62 completely conceals the central portion 30 of the bumper support part 20. The first lateral fascia portion 52 overlays and covers the first lateral portion 32 of the bumper support part 20. Similarly, the second lateral fascia portion 54 overlays and covers the second lateral portion 34 of the bumper support part 20. Further, the first upwardly extending portion 56 (the first upright fascia portion) extends upward from the central fascia portion 50 and covers the curved portion 38, while the second upwardly extending portion 58 (the second upright fascia portion) extends upward from the central fascia portion 50 and covers the curved portion 40.

The central fascia portion 50 defines a first step surface 50a. Similarly, the first lateral fascia portion 52 defines a first lateral step surface 52a and the second lateral fascia portion 54 defines a second lateral step surface 54a.

As well, the first lateral fascia portion 52 includes a contoured and curved portion 52b with a radius of curvature that conforms to and covers the contoured and curved portion 32b of the bumper support part 20. Further, the second lateral fascia portion 54 includes a contoured and curved portion 54b with a radius of curvature similar to that of the contoured and curved portion 52b that conforms to and covers the contoured and curved portion 34b of the bumper support part 20.

Hence, the bumper support part 20 is covered and concealed by the fascia member 22 as viewed from the rear, from above and from lateral sides of the vehicle 10.

Figure 2:
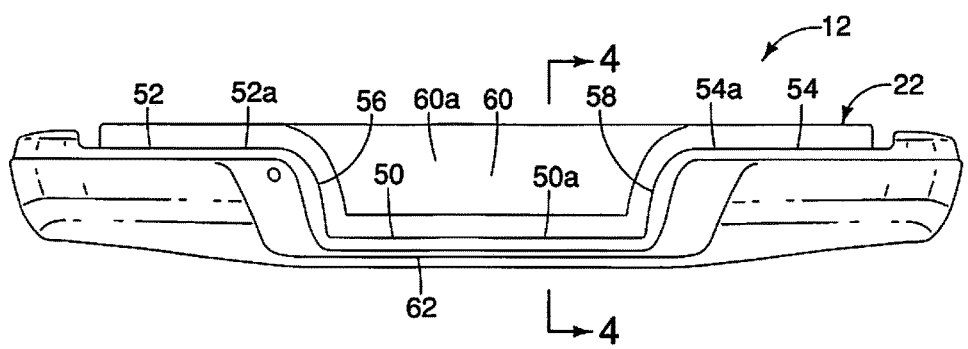
FIG. 2 is a rear view of the bumper assembly shown removed from the vehicle in accordance with the first embodiment.

As shown in FIGS. 2, 3 and 4, the upright fascia portion 60 extends upward from the central fascia portion 50, and also extends from the first upwardly extending portion 56 to the second upwardly extending portion 58. The upright fascia portion 60 defines a license plate attachment surface 60a.

In the depicted embodiment, the fascia member 22 is a one piece, monolithic, unitarily formed element. More specifically, the central fascia portion 50, the first lateral fascia portion 52, the second lateral fascia portion 54, the first upwardly extending portion 56, the second upwardly extending portion 56 and the upright fascia portion 60 are all one piece that is a monolithic, unitarily formed element.

As shown in FIG. 3, the bumper support part 20 can include optional diagonal brackets 24 that can be employed to provide greater rigidity to the bumper support part 20, if necessary. One end of the diagonal brackets 24 is fixed to a respective ones of the curved portions 38 and 40 of the bumper support part 20, and the other end of the diagonal brackets is fixed to respective ones of the attachment brackets 26. The optional diagonal brackets 24 are removed in FIG. 5 in order to provide greater clarity with respect to the depictions of the attachment brackets 26 and 28.

Figure 5:
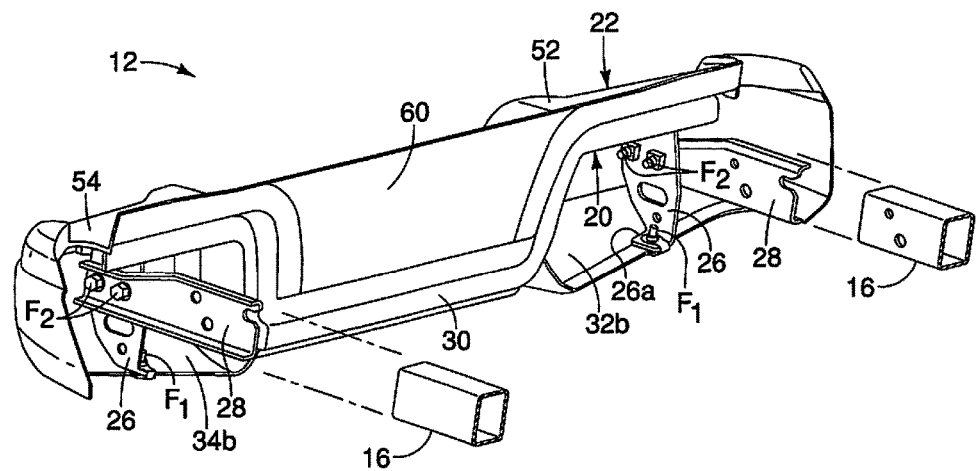
FIG. 5 is a perspective front view of the bumper assembly showing attachment brackets and beams of the vehicle in accordance with the first embodiment.
Figure 6:
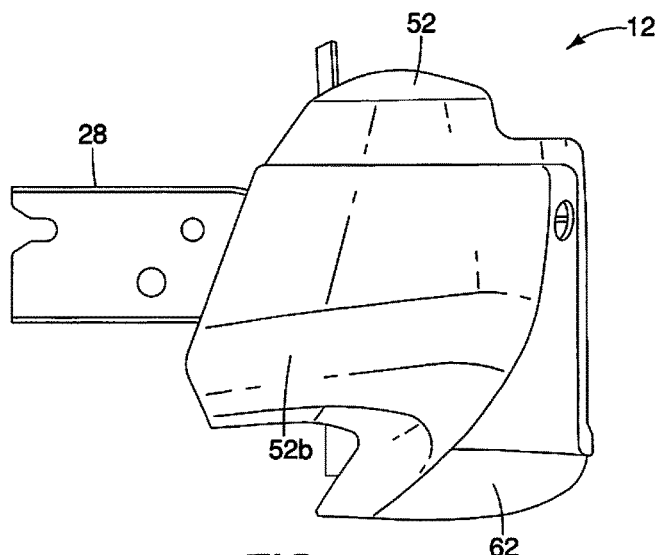
FIG. 6 is a side view of the bumper assembly shown removed from the vehicle in accordance with the first embodiment.

As shown in FIG. 5, the attachment brackets 26 are basically a pair of vertically oriented metal brackets with metal projections 26a (FIG. 5) that are fixedly attached via mechanical fasteners $F_1$ to the contoured and curved portion 32b and 34b (opposite side portions) of the bumper support part 20. The attachment brackets 26 are also fixedly attached via mechanical fasteners (not shown) to the first and second lateral portion 32 and 34 beneath the lateral step support surfaces 32a and 34a. The attachment bracket 28 are basically horizontally extending brackets that fixedly attached via mechanical fasteners $F_2$ to the respective ones of the attachment brackets 26. Front ends of the attachment bracket 28 are attached to respective ones of the beams 16 (main frame beams) of the vehicle 10 via mechanical fasteners (not shown).

Second Embodiment

Figure 7:
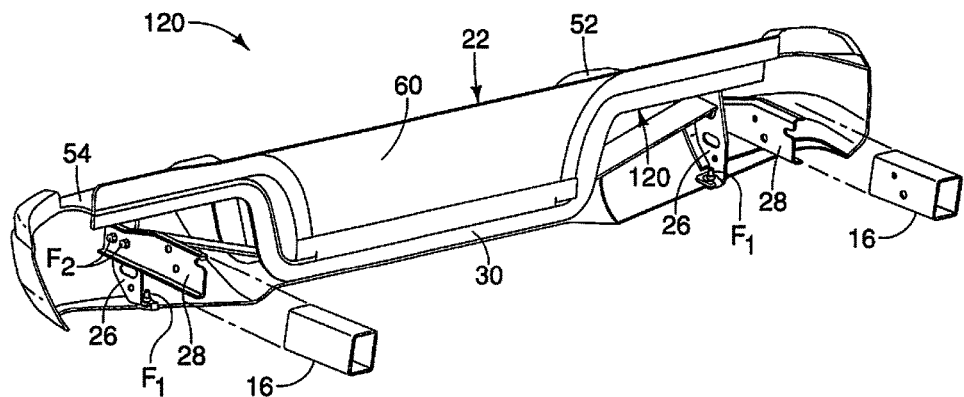
FIG. 7 is a perspective front view of a bumper assembly in accordance with a second embodiment.
Figure 8:
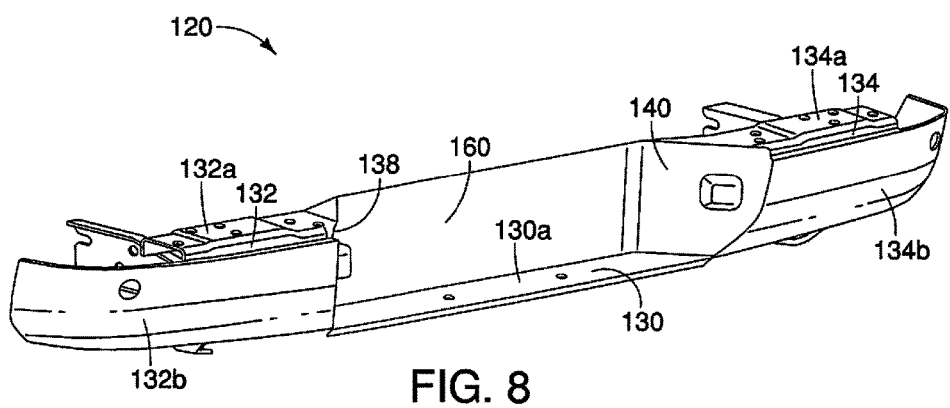
FIG. 8 is a perspective rear view of a metal bumper support assembly with the fascia member removed in accordance with the second embodiment.
Figure 9:
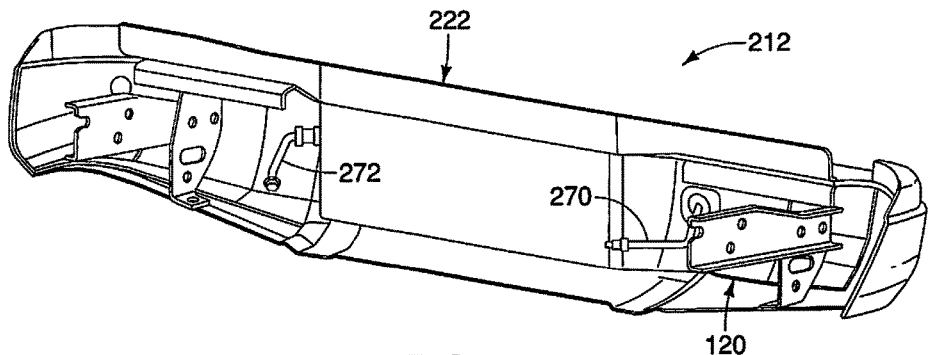
FIG. 9 is a perspective front view of a bumper assembly that includes electric lights in accordance with a third embodiment.
Figure 10:
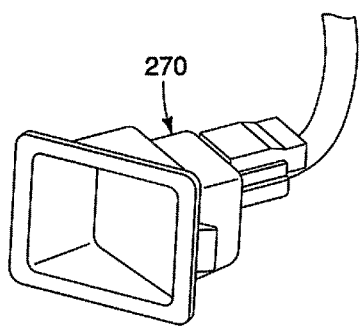
FIGS. 10 and 11 show first and second electric lights of the bumper assembly shown removed from the bumper assembly in accordance with the third embodiment.
Figure 11:
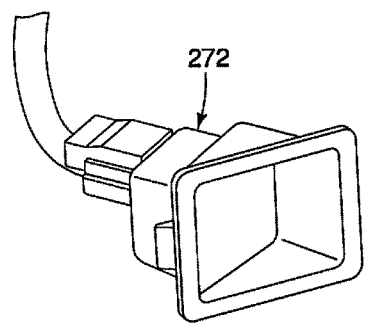

Referring now to FIGS. 7-8, a bumper assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the bumper assembly 112 includes a bumper support part 120 and the fascia member 22 of the first embodiment. Since the fascia member 22 is identical to that described in the first embodiment, for the sake of brevity further description of the fascia member 22 is omitted.

The bumper support part 120 of the second embodiment is constructed from a plurality of metal elements that can be attached to one another via mechanical fasteners or welded together, or fixed to one another via combinations of welded seams and mechanical fasteners. Specifically, the bumper support part 120 includes a central portion 130, a first lateral portion 132 and a second lateral portion 134. However, in the second embodiment, the curved portions 38 and 40 of the first embodiment are replace with upright flat portions 138 and 140. The central portion 130 defines a center step support surface 130a. The first lateral portion 132 defines a lateral step support surface 132a and a contoured and curved portion 132b. The second lateral portion 134 defines a lateral step support surface 134a and a contoured and curved portion 134b.

Further, in the second embodiment the bumper support part 120 includes an upright portion 160 that is dimensioned and configured to support the upright portion 60 of the fascia member 22.

Third Embodiment

Referring now to FIGS. 9-14, a bumper assembly 212 in accordance with a third embodiment will now be explained. In view of the similarity between the first, second and third embodiments, the parts of the third embodiment that are identical to the parts of the first embodiment or the second embodiment will be given the same reference numerals as the parts of the first embodiment or the second embodiment. Moreover, the descriptions of the parts of the third embodiment that are identical to the parts of the first embodiment and second embodiment may be omitted for the sake of brevity.

Figure 12:
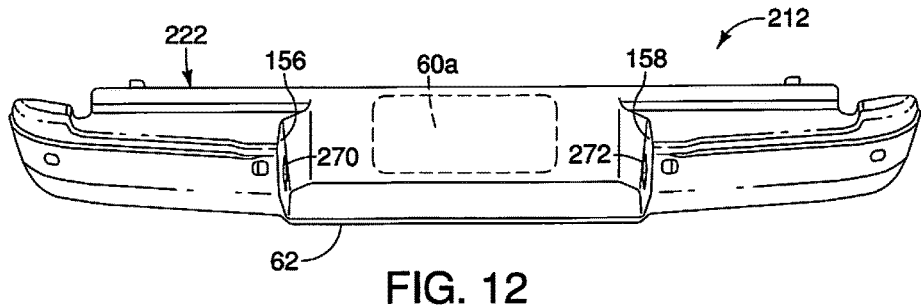
FIG. 12 is a rear view of the bumper assembly showing the first and second electric lights installed and positioned to illuminate a license plate attachment surface in accordance with the third embodiment.

In the third embodiment, the bumper assembly 212 a fascia member 222 that is identical to the fascia member 22 of the first embodiment, except that the first upwardly extending portion 56 and the second upwardly extending portion 58 are replaced with vertical portions 156 and 158, as shown in FIG. 12. The vertical portions 156 and 158 define surfaces that are planar. In addition, the bumper support part 120 is a one piece, monolithic, unitary element formed from stamped sheet metal.

Figure 13:
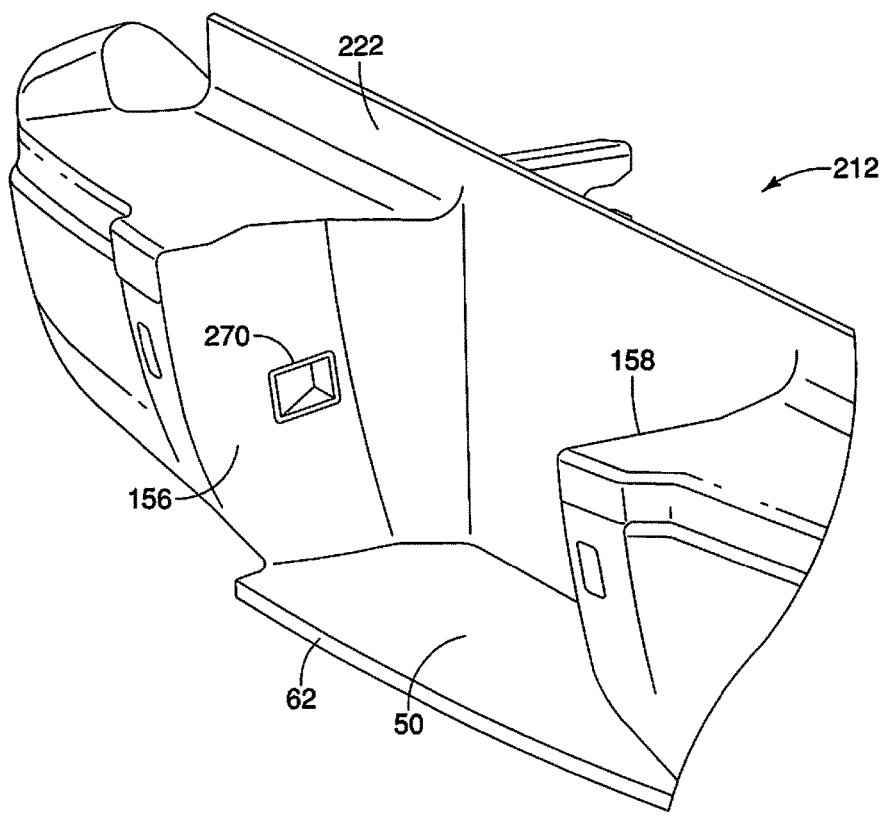
FIG. 13 is a perspective rear view of a portion of the bumper assembly showing one of the light assemblies in accordance with the third embodiment.
Figure 14:
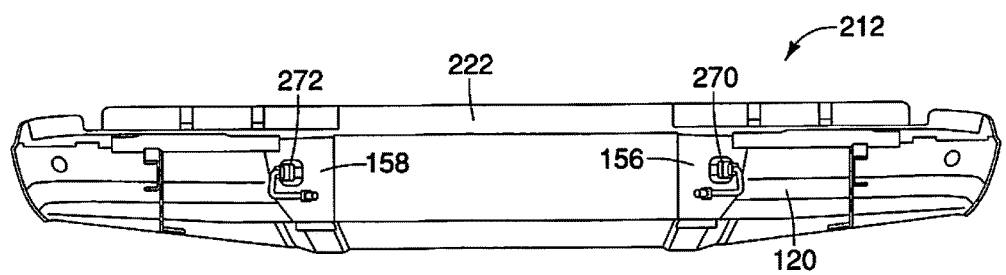
FIG. 14 is a front view of the bumper assembly in accordance with the third embodiment.

The bumper assembly 212 also includes lamps 270 and 272 that are installed to openings (not shown) in the vertical portions 156 and 158 and corresponding openings in the upright flat portions 138 and 140 of the bumper support part 120, as shown in FIGS. 12 and 14. The lamps 270 and 272 are positioned and arranged to illuminate the license plate attachment surface 60a of the fascia member 222, as shown in FIGS. 12 and 13.

The vehicle structural elements other than the bumper assembly are conventional components that are well known in the art. Since vehicle structural elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the title. Accordingly, these terms, as utilized to describe the present invention should be interpreted relative to a vehicle equipped with the vehicle bumper assembly.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A vehicle bumper assembly, comprising:
    a bumper support part having a central portion defining a first step plane located a first distance above ground level when installed to a vehicle, and a pair of lateral portions on opposite sides of the central portion defining a second step plane located a second distance above ground level when installed to the vehicle, the second distance being greater than the first distance; and
    a fascia member shaped and configured to cover and conceal at least all upper facing surfaces, all side facing surfaces and all rearward facing surfaces of the bumper support part when installed to a vehicle, the fascia member having a central fascia portion overlaying and covering the central portion of the bumper support part, a pair of lateral fascia portions overlaying and covering the pair of lateral portions of the bumper support part and an upright fascia portion extending upward from the central fascia portion from a first of the pair of lateral fascia portions to a second of the pair of lateral fascia portions, the fascia member being a one piece, monolithic, unitarily formed element.
2. The vehicle bumper assembly according to claim 1, wherein
    the fascia member further includes a pair of upwardly extending surfaces facing one another that extend upward from opposing lateral ends of the central fascia portion to corresponding ones of the pair of lateral fascia portions.

3. The vehicle bumper assembly according to claim 2, wherein
each of the pair of upwardly extending surfaces have upper portions that are contoured with a radius of curvature adjacent to the pair of lateral fascia portions.

4. The vehicle bumper assembly according to claim 2, wherein
each of the pair of upwardly extending surfaces are planar.

5. The vehicle bumper assembly according to claim 1, wherein
the central fascia portion further includes a pocket area such that the central portion of the bumper support part is inserted into the pocket area with the central fascia portion further overlaying and covering an upper surface and a lower surface of the central portion of the bumper support part.

6. The vehicle bumper assembly according to claim 1, wherein
the first step plane and the second step plane are parallel to one another.

7. The vehicle bumper assembly according to claim 1, wherein
the bumper support part is a one piece, monolithic, unitarily formed element.

8. The vehicle bumper assembly according to claim 7, wherein
the bumper support part is formed by press-forming from a single sheet of metal material.

9. The vehicle bumper assembly according to claim 1, wherein
the bumper support part is an assembly of metallic elements welded together defining the bumper support part.

10. The vehicle bumper assembly according to claim 1, further comprising:
a pair of vertically oriented brackets fixedly attached to opposite side portions of the bumper support part, and
a pair of horizontally extending brackets, each having a front end and a rear end, the rear ends thereof being fixedly attached to corresponding ones of the pair of vertically oriented brackets, and the front ends being configured to fixedly attach to corresponding ones of main frame beams of the vehicle.

11. A vehicle bumper assembly comprising:
a bumper support part having a central portion defining a first step plane located a first distance above ground level when installed to a vehicle, and a pair of lateral portions on opposite sides of the central portion defining a second step plane located a second distance above ground level when installed to the vehicle, the second distance being greater than the first distance;
a fascia member shaped and configured to cover and conceal at least upper, side and rearward facing surfaces of the bumper support part, the fascia member having a central fascia portion overlaying and covering the central portion of the bumper support part, a pair of lateral fascia portions overlaying and covering the pair of lateral portions of the bumper support part and an upright fascia portion extending upward from the central fascia portion from a first of the pair of lateral fascia portions to a second of the pair of lateral fascia portions. the fascia member being a one piece, monolithic, unitarily formed element;
a pair of vertically oriented brackets fixedly attached to opposite side portions of the bumper support part;
a pair of horizontally extending brackets, each having a front end and a rear end, the rear ends thereof being fixedly attached to corresponding ones of the pair of vertically oriented brackets, and the front ends being configured to fixedly attach to corresponding ones of main frame beams of the vehicle; and
a pair of diagonal brackets having inboard ends attached to corresponding opposite outboard sides of the central portion of the bumper support part, and outboard ends fixedly attached to upper portions of corresponding ones of the pair of the vertically oriented brackets.

12. The vehicle bumper assembly according to claim 10, wherein
each of the pair of vertically oriented brackets includes a metal projection that extends in a horizontal direction from lower ends of the pair of vertically oriented brackets providing an attachment area for securing the fascia member thereto.

13. The vehicle bumper assembly according to claim 1, wherein
the upright fascia portion defining a license plate attachment surface.

14. The vehicle bumper assembly according to claim 13, wherein
each of the pair of lateral fascia portions includes an upright section that extends along corresponding lateral ends of the upright fascia portion, each of the upright sections have a light installed thereto oriented to provide light to the license plate attachment surface.

* * * * *